(12) United States Patent
Hearn

(10) Patent No.: US 8,373,743 B2
(45) Date of Patent: Feb. 12, 2013

(54) SYSTEM AND METHOD FOR PLAYING BACK INDIVIDUAL CONFERENCE CALLERS

(75) Inventor: Michel Lee Hearn, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 848 days.

(21) Appl. No.: 12/403,624

(22) Filed: Mar. 13, 2009

(65) Prior Publication Data

US 2010/0232579 A1 Sep. 16, 2010

(51) Int. Cl.
*H04N 7/14* (2006.01)
(52) U.S. Cl. ............... 348/14.08; 348/14.09; 348/14.12
(58) Field of Classification Search .... 348/14.01–14.16; 379/202.01; 709/204
See application file for complete search history.

(56) References Cited

U.S. PATENT DOCUMENTS

| 5,668,863 | A  | * | 9/1997  | Bieselin et al. | 379/202.01 |
| 7,003,286 | B2 |   | 2/2006  | Brown et al.    |            |
| 7,085,558 | B2 |   | 8/2006  | Berstis et al.  |            |
| 7,266,189 | B1 |   | 9/2007  | Day             |            |
| 2004/0207724 | A1 | * | 10/2004 | Crouch et al. | 348/14.09 |
| 2005/0018828 | A1 | * | 1/2005  | Nierhaus et al. | 379/202.01 |
| 2007/0263603 | A1 |   | 11/2007 | Schmitt         |            |

* cited by examiner

*Primary Examiner* — Melur Ramakrishnaiah

(57) ABSTRACT

A teleconferencing system receives at least two streams that are parts of a live conference and individually records at least one of the streams. During the conference, a conferencing system receives a request from a communication device that is participating in the conference for at least a portion of at least one but not all of the recorded streams and in response sends the requested portion(s) of the stream to the communication device. The communication device can then play back the requested portion(s) of the recorded stream(s) to a participant in the conference. The streams may be audio and/or video streams.

21 Claims, 3 Drawing Sheets

SYSTEM AND METHOD FOR PLAYING BACK INDIVIDUAL CONFERENCE CALLERS

TECHNICAL FIELD

The system and method relates to teleconferencing systems and in particular to recording of conferences.

BACKGROUND

Currently, a teleconference call can be recorded and then played back. Typically, the mixed stream of the teleconference (mixed stream of all callers on the teleconference) is recorded. The recorded mixed stream of the teleconference can then be played back. For example, U.S. Patent Application Publication 2007/0263603 describes a system that allows a participant to pause the teleconference and thereafter play back the teleconference at a controllable speed and rejoin the live teleconference. Moreover, systems such as described in U.S. Pat. No. 7,085,558 allows a participant who was dropped from a teleconference to join the teleconference at the point the participant was dropped and play back the missed portion of the teleconference stream. The participant can then fast forward through the missed portion and then rejoin the teleconference.

The problem with existing systems is that during a live conference, the mixed audio and/or video stream of all of the conference participants is the only available stream that can be played back during the conference. In a typical conference, two or more participants will at some point speak at the same time. This speaker overlap can cause the participants of the conference to not understand what is being said. In addition, if a caller speaks softly, their voice may be difficult to hear based on noise by other speakers or background noise from other sources than the speaker's audio stream. Simply playing-back the mixed conference stream will not allow someone listening to understand what has been said. This is because the participant will hear/see the same message. Because of these problems, the other participants may have to speak up and tell the other people in the conference to repeat what was said.

This problem is exacerbated in situations where some users may be able to speak/listen and other may only be able to listen because they are receiving the teleconference in broadcast mode. In this case, those who are in broadcast-only mode cannot tell the speaker(s) to repeat what was said.

In addition, a participant may not see what someone said/did in a video conference because the system may not be displaying the particular participant at the time. The video system may only be focused on the main person who is speaking and not another participant. By playing back the previously displayed video, the attendee may not to be able to see what another person was doing during the video conference.

SUMMARY

The system and method are directed to solving these and other problems and disadvantages of the prior art. The system and method establish a live conference at a conferencing system. The conferencing system receives a plurality of streams that are parts of the conference. The conferencing system individually records at least one of the streams. During the conference, the conferencing system receives a request from a communication device that is participating in the conference to play back at least a portion of an individually-recorded stream; the conferencing system sends the requested portion of the recorded stream to the communication device. The communication device can then play back the requested portion of the recorded stream to a participant in the conference. The streams can be audio and/or video streams.

BRIEF DESCRIPTION OF THE DRAWING

These and other features and advantages of the system and method will become more apparent from considering the following description of an illustrative embodiment of the system and method together with the drawing, in which.

DETAILED DESCRIPTION

Figure 1:
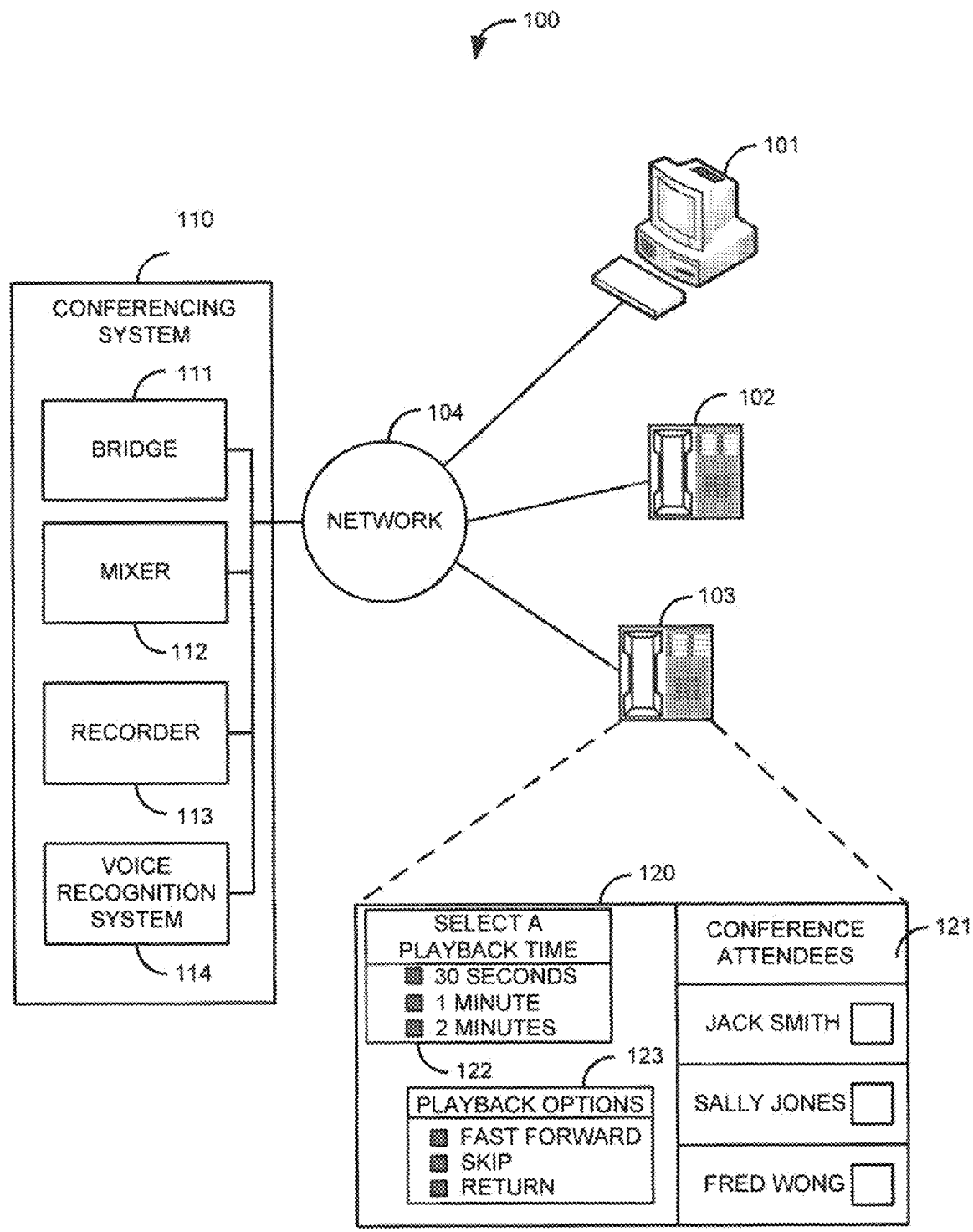
FIG. 1 is a block diagram of a system for recording and playing-back audio/video streams during a live conference.

FIG. 1 is a block diagram of a system 100 for recording and playing-back audio/video streams during a live conference. The system 100 comprises a conferencing system 110, a network 104, and communication devices 101-103. The conferencing system 110 can be any device capable of establishing an audio/video conference such as a Private Branch Exchange (PBX), a server, a router, a personal computer, and the like. The network 104 can be any network capable of sending and receiving audio/video streams such as the Internet, the Public Switched Telephone Network (PSTN), a cellular network, a packet switched network, a wired network, a wireless network, a private network, and the like.

The communication devices 101-103 can be any device capable of sending an audio stream such as a telephone, a Personal Computer (PC), a Personal Digital Assistant (PDA), a cellular telephone, a router, a server, and the like. In addition, the communication devices 101-103 can be any device capable of supporting an audio/video conference such as a telephone with a video camera. The communication devices 101-103 can further comprise a Graphical User Interface (GUI) 120. The GUI 120 can comprise different windows 121-123 that are used to play back individual streams of the conference. The windows 121-123 can include, but are not limited to an attendee's window 121, a playback time window 122, and a playback options window 123.

The conferencing system 110 comprises a bridge 111, a mixer 112, a recorder 113, and a voice recognition system 114. The bridge 111 can be any device capable of setting up a conference. The mixer 112 can be any device capable of mixing multiple audio/video streams. The recorder 113 can be any device capable of recording individual audio/video streams. The voice recognition system 114 can be any system capable of processing voice commands. The bridge 111 the mixer 112, the recorder 113, and the voice recognition system 114 are shown as parts of the conferencing system 110. However, the bridge 111, the mixer 112, the recorder 113, and the voice recognition system 114 could be separate devices. For example, the voice recognition system 114 could be part of a communication device 101-103.

When a conference is established, three or more attendees call in from the communication devices 101-103 via the network 104. The attendees can also communicate to the conference system 110 directly (not shown). The communication devices 101-103 send a request to join the conference. The bridge 111 establishes the live conference from the communication devices 101-103. For brevity, only three communication devices 101-103 are shown, but any number of additional communication devices (not shown) could call in to the live conference. Typically, all the communication devices 101-103 will send an audio and/or video stream to the bridge. However, in some embodiments, some of the communication devices 101-103 could be in listen-only mode, and therefore not send an audio and/or video stream to the bridge 111.

Upon establishing the live conference, the mixer 112 mixes the streams sent from the communication devices 101-103. There must be at least two received streams from the communications devices in order for the mixer 112 to mix the streams. The mixed stream of the conference is then streamed to each of the communication devices 101-103 on the live conference. The communication devices 101-103 receive the mixed stream of the conference and then play the mixed stream of the live conference to the attendees. If the streams are audio streams, the at least two audio streams in the conference comprise the mixed stream. If the streams are video streams, the at least two video streams are mixed using known techniques such as individual windows for each of the attendees.

The recorder 113 individually records at least one of the received streams that are sent from the communication devices 101-103. An individually recorded stream is a stream that is separate from the other component streams of the conference. In a preferred embodiment, the recorder 113 records each of the received streams from the communication devices 101-103.

An attendee at one of the communication devices 101-103 can select (using a selection method) a stream of an attendee of the conference from the conference attendees window 121. The conferencing system 110 can identify attendees of the conference in the conference attendees window 121 from the attendees' telephone numbers or in other know ways. In a preferred embodiment, the attendee selects an attendee's stream by pushing a soft button on the attendees window 121. For example, the attendee could select the stream from Jack Smith by pushing the soft button (or other mechanism) next to Jack Smith's name (or Jack Smith's name itself) in the attendees window 121. The attendee can select a playback time using the playback time window 122. The playback time is how far back into the conference the attendee wants to listen/view. The communication device 101-103 then sends a request to play back the selected amount of the selected stream. The recorder 113 receives the request to play back the portion of the selected stream. The recorder 113 then starts streaming the recorded portion (starting back from the indicated amount of time) of the selected stream(s) in place of the mixed stream of the live conference. The communication devices 101-103 then receive the portion of the selected stream.

The attendee could then push a soft button on the playback options window 123 to fast forward the selected stream, skip a portion of the selected stream, or return to the live conference. The attendee can fast forward until the recorded stream reaches the same time as the live conference. At this point, the attendee will again start hearing and/or seeing the mixed stream of the live conference.

Instead of using a GUI 120, an attendee at a communication device 101-103 could use a different selection method. The attendee can speak voice commands (using a side bar) that the voice recognition system 114 would recognize. For example, the attendee could hit a button and say "playback the last 30 seconds of what Jack Smith said." The voice recognition system 114 would recognize the command and send a message to the recorder 114 to execute the command. The recorder 113 would then stream the last 30 seconds of what Jack Smith said in the conference to the attendee at the communication device 101-103 that the request originated at.

To illustrate how this works, consider the following example. Assume that a live teleconference is established between communication devices 101-103. The live teleconference is attended by Jack Smith, Sally Jones, and Fred Wong. Jack Smith is on communication device 101, Sally Jones is on communication device 102, and Fred Wong is on communication device 103.

Fred Wong selects to playback Jack Smith's audio stream from the conference attendees window 121 by pushing the button next to Jack Smith's name. Fred Wong then selects to play back the last 30 seconds of what Jack Smith said from the playback time window 122. Communication device 103 sends a request to the recorder 113 to play back the last 30 seconds of Jack Smith's audio stream. The recorder then streams the previous 30 seconds of what Jack Smith spoke during the teleconference.

In this example, Fred Wong selected only Jack Smith's audio stream to playback. However, the Fred Wong could select both Jack Smith's and Sally Jones' audio streams to play back. In this case, communication device 103 would send a request to the recorder 113 to play back a mixed audio stream that has only Jack Smith's and Sally Jones' audio stream (excluding Fred Wong's audio stream). The mixer 112 mixes the two recorded audio streams (Jack's and Sally's) and sends the mixed stream to communication device 103 for Fred Wong to listen to.

Figure 2:
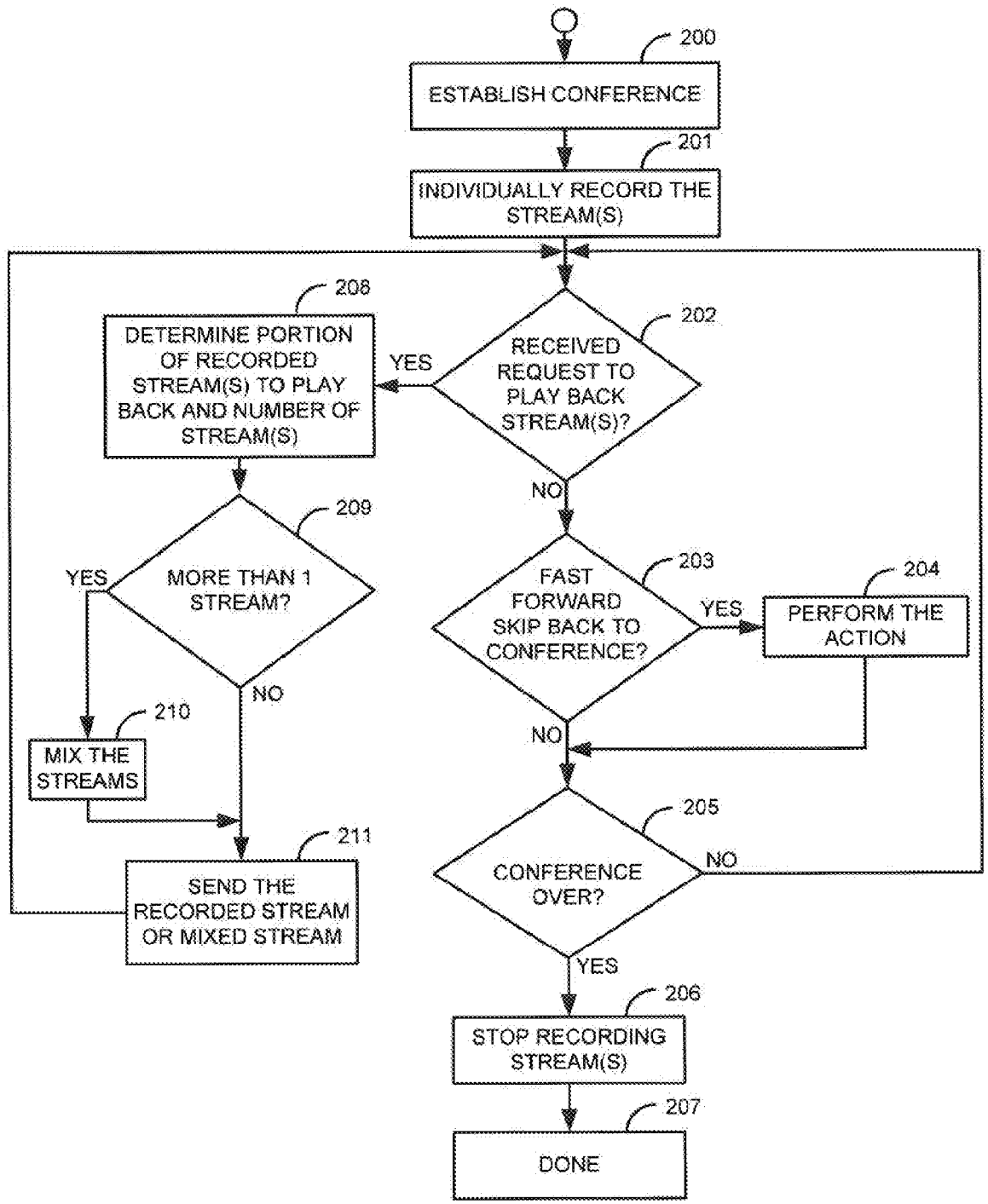
FIG. 2 is a method for recording and sending a requested audio/video stream during a live conference from a conferencing system.

FIG. 2 is a method for recording and sending a requested audio/video stream during a live conference from a conferencing system 110. Illustratively, the bridge 111, the mixer 112, the recorder 113, the voice recognition system 114, and the communication devices 101-103 are stored-program-controlled entities, such as a computer, which perform the method of FIGS. 2-3 by executing a program stored in a storage medium, such as a memory or disk.

The process begins when the bridge 111 establishes 200 a conference call between three or more communication devices 101-103. The recorder 113 individually records 201 the streams from the communication device(s) 101-103 in the live conference. The recorder 113 determines 202 if a request to play back at least a portion of at least one, but not all of the individually recorded streams have been received.

If a request to playback at least one, but not all of the streams has been received in step 202, the recorder 113 determines 208 the portion of the recorded stream(s) to playback and the number of stream that are being requested to be played-back. The recorder 113 determines 209 if there is more than one stream to playback. If there is more than one stream, the mixer 112 mixes 210 the streams and sends 211 the mixed stream to the requesting communication device 101-103. Otherwise, if there is only one stream to be played-back in step 209, the recorder 113 streams 211 the recorded stream to the communication device 101-103. The process then again determines 202 if a request to playback at least a portion of the at least one, but not all of the individually recorded streams has been received.

If a request to playback a recorded stream in step 202 has not been received, the recorder 113 determines 203 if a request to fast forward, skip, or go back to the conference call has been received. If one of the requests in step 203 has been received, the action is performed 204 and the process goes to step 205. Otherwise if the request to fast forward, skip or go back to the call has not been received in step 203, the process determines 205 if the conference is over. If the conference is over in step 205, the recorder 113 stops recording 206 the streams and is done 207. If the conference is not over in step 205, the recorder again determines 202 if a request to playback the stream(s) has been received.

Figure 3:
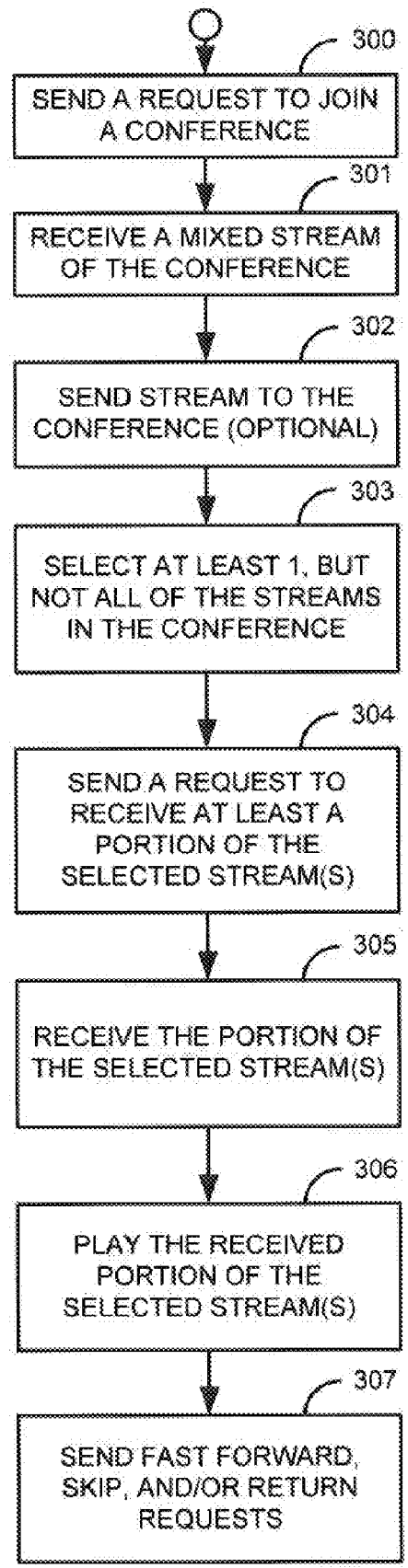
FIG. 3 is a method for requesting a recorded audio/video stream, receiving the requested audio/video steam, and playing-back the requested audio/video stream in a communication device.

FIG. 3 is a method for requesting a recorded audio/video stream, receiving the requested audio/video steam, and palying-back the requested audio/video stream in a communication device 101-103. The process begins when a communication device 101-103 sends 300 a request to the conferencing system 110 to join a conference. After joining the conference, the communication device 101-103 receives 301 a mixed stream of the live conference. The communication device then optionally sends 302 a stream to the conferencing system 110. The communication device 101-103 does not have to send a stream if the communication device 101-103 is only receiving the mixed stream of the live conference (the conferencing system 110 is in broadcast mode to the communication device 101-103).

An attendee of the conference selects 303 at least one, but not all of the recorded streams in the conference. The communication device 101-103 sends 304 a request to receive at least a portion of the selected stream(s). The communication device 101-103 receives 305 the portion of the selected stream(s). The communication device 101-103 plays 306 the received portion of the slected stream(s). The attendee of the conference can then select to fast forward, skip and/or return to the live conference. The communication device 101-103 then sends 307 a request to fast forward, skip, and/or return to the live conference.

Of course, various changes and modifications to the illustrative embodiment described above will be apparent to those skilled in the art. These changes and modifications can be made without departing from the spirit and the scope of the system and method and without diminishing its attendant advantages. It is therefore intended that such changes and modifications be covered by the following claims except insofar as limited by the prior art.

What is claimed is:

1. A system for recording and putting out streams during a live conference comprising:
   a. a bridge configured to establish the live conference and receive a plurality of streams that are parts of the conference; and
   b. a recorder configured to individually record at least one of the plurality of streams, to receive a request for at least a portion of the at least one but not all of the plurality of streams, and to output only the requested at least a portion of the at least one but not all of the plurality of streams.

2. The system of claim 1, wherein the plurality of streams are at least one item selected from the group comprising: an audio stream and a video stream.

3. The system of claim 1, wherein the recorder is configured to individually record each of the plurality of streams.

4. The system of claim 3, wherein the request for the at least a portion of the at least one, but not all of the plurality of streams is a request for at least portions of more than one, but not all of the plurality of streams and further comprising:
   c. a mixer configured to mix only the at least portions of the more than one, but not all of the plurality of streams and output the mixed portions.

5. The system of claim 1, further comprising a communication device configured to select the at least a portion of the at least one stream using a selection method and send the request for the at least a portion of the at least one stream.

6. The system of claim 5, wherein the selection method is accomplished by using at least one item selected from the group comprising: a graphical user interface and a voice recognition system.

7. The system of claim 5, wherein the communication device is a device selected from the group comprising: a telephone, a cellular telephone, a personal digital assistant, a personal computer, and an audio/video device.

8. The system of claim 1, further comprising a communication device configured to receive the at least a portion of the at least one stream and play the received at least a portion of the at least one stream.

9. The system of claim 8, wherein the communication device is configured to perform at least one item selected from the group comprising: fast forward through the received at least a portion of the at least one stream, skip at least some of the received at least one stream, skip at least some of the received at least a portion of the at least one stream, and return to the live conference.

10. A system for joining and playing-back at least one stream during a live conference comprising: a communication device configured to send a request to join the live conference at a conferencing system, wherein the conferencing system is receiving a plurality of streams that are parts of the conference, to receive a mixed stream of the conference, wherein the mixed stream of the conference comprises the plurality of streams, to select at least one, but not all of the plurality of streams, to send a request for at least a portion of the selected at least one, but not all of the plurality of streams, to receive a mixed said portion of the selected at least one, but not all of the plurality of streams, and to play the received mixed said portion.

11. A method for recording and putting out streams during a live conference comprising:
   a. establishing the live conference at a conferencing system, wherein the conferencing system is receiving a plurality of streams that are parts of the conference;
   b. individually recording at least one of the plurality of streams;
   c. receiving a request for at least a portion of the at least one stream; and
   d. outputting the at least a portion of the at least one stream.

12. The system of claim 11, wherein the plurality of streams are at least one item selected from the group comprising: an audio stream and a video stream.

13. The method of claim 11, wherein individually recording the at least one of the plurality of streams further comprises individually recording each of the plurality of streams.

14. The method of claim 13, wherein the request for the at least a portion of the at least one but not all of the plurality of streams is a request for the at least a portion of more than one, but not all of the plurality of streams, and wherein the method further comprises the steps of:
   e. mixing the requested at least a portion of more than one, but not all of the plurality of streams; and
   f. outputting the mixed requested portions.

15. The method of claim 11, further comprising the steps of:
   e. selecting the at least a portion of the at least one stream using a selection method; and
   f. sending the request for the selected at least a portion of the at least one stream.

16. The method of claim 15, wherein the selection method is accomplished by using at least one item selected from the group comprising: a graphical user interface and a voice recognition system.

17. The method of claim 15, wherein the request for the at least a portion of the at least one stream is sent from a device selected from the group comprising: a telephone, a cellular telephone, a personal digital assistant, a personal computer, and an audio/video device.

18. The method of claim 11, further comprising the steps of:
   e. receiving the at least a portion of the at least one stream; and
   f. playing the received at least a portion of the at least one stream.

19. The method of claim 18, further comprising at least one step selected from the group comprising: fast forwarding through the received at least a portion of the at least one stream, skipping at least some of the at least a portion of the at least one stream and returning to the live conference.

20. A method for joining and playing-back at least one stream during a live conference comprising:
   a. sending a request to join the live conference at a teleconferencing system, wherein the teleconferencing system is receiving a plurality of streams that are parts of the conference;
   b. receiving a mixed stream of the conference, wherein the mixed stream of the conference comprises the plurality of streams;
   c. selecting at least one, but not all of the plurality of streams;
   d. sending a request for at least a portion of the selected at least one, but not all of the plurality of streams;
   e. in response to a request for one portion, receiving the requested portion, and in response to a request for a plurality of portions, receiving mixed said requested portions; and
   f. playing the received at least one portion.

21. An apparatus for recording and putting out streams during a live conference comprising:
   a. means for establishing the live conference at a conferencing system, wherein the conferencing system receives a plurality of streams that are parts of the conference;
   b. means for individually recording at least one of the plurality of streams;
   c. means for receiving a request for at least a portion of the at least one stream and
   d. means for outputting the at least a portion of the at least one stream.

* * * * *